United States Patent [19]

Catros

[11] Patent Number: 4,591,907
[45] Date of Patent: May 27, 1986

[54] METHOD AND DEVICE FOR DETECTION OF MOVING POINTS IN A TELEVISION IMAGE FOR DIGITAL TELEVISION SYSTEMS PROVIDING CONDITIONAL-REPLENISHMENT BIT-RATE COMPRESSION

[75] Inventor: Jean-Yves Catros, Rennes, France

[73] Assignee: Thomson-CSF, Paris, France

[21] Appl. No.: 628,872

[22] Filed: Jul. 9, 1984

[30] Foreign Application Priority Data

Jul. 13, 1983 [FR] France ................... 83 11736

[51] Int. Cl.⁴ ............................................. H04N 7/12
[52] U.S. Cl. ...................................... 358/136; 358/105
[58] Field of Search ............... 358/105, 133, 135, 136; 375/27, 28, 29; 364/725, 727, 826, 827

[56] References Cited

U.S. PATENT DOCUMENTS

| | | | |
|---|---|---|---|
| 3,679,821 | 7/1972 | Schroeder | 358/136 |
| 3,984,626 | 8/1975 | Mounts et al. | 358/133 |
| 4,240,109 | 12/1980 | Michael et al. | 358/105 |
| 4,281,344 | 7/1981 | Mounts et al. | 358/136 |

FOREIGN PATENT DOCUMENTS 3029190 3/1982 Fed. Rep. of Germany .

OTHER PUBLICATIONS

Bostelmann, "Ein Codec fur Bildfernsprechsignale mit subjektiv optimiertem Bewegungsdetektor", Frequenz, vol. 33, No. 1, Jan. 1979, pp. 2–8.

Wendt, "Schmalband–Codierung", Nachrichtentechnische Zeitschrift, vol. 30, No. 3, Mar. 1977, pp. 245–250.

Heath, "Reshaping Information to Suit the Channel", Wireless World, vol. 78, No. 1441, Jul. 1972, pp. 320–324.

Primary Examiner—Joseph A. Orsino, Jr.
Attorney, Agent, or Firm—Pollock, Vande Sande & Priddy

[57] ABSTRACT

In a method for detection of moving points in a television image for digital television systems providing conditional-replenishment bit-rate compression, the image is split-up into blocks of $N \times M$ points, the points of one block being located at the intersections of N lines and M columns of the image. The $N \times M$ inter-image differences between values of luminance and/or of chrominance are converted to $N \times M$ coefficients by means of an orthogonal transformation. The absolute values of the coefficients obtained are compared with one or a number of predetermined reference thresholds in order that the points placed at the center of a block should be stated as moving when the absolute value of at least one coefficient obtained as a result of this transformation is higher than at least one predetermined reference threshold.

The device comprises an array of shift registers for storing the inter-image differences, a matrixing element for calculating the coefficients and a decision element.

6 Claims, 3 Drawing Figures

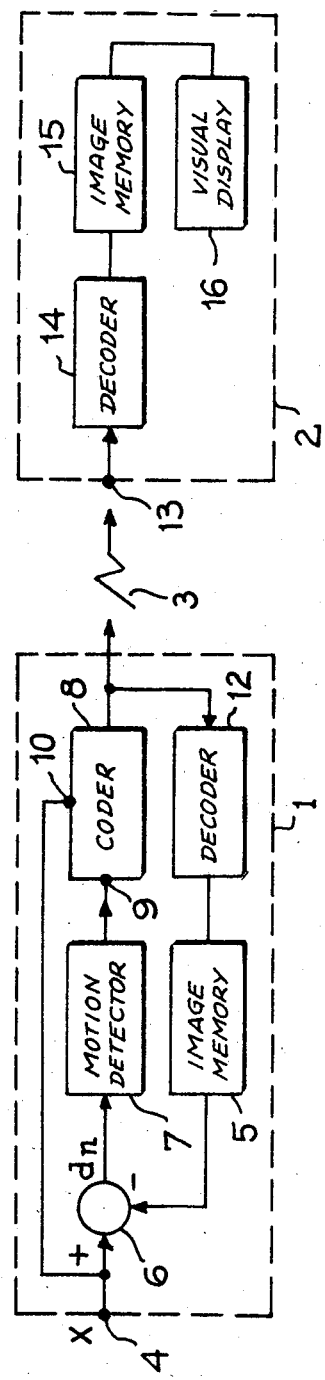
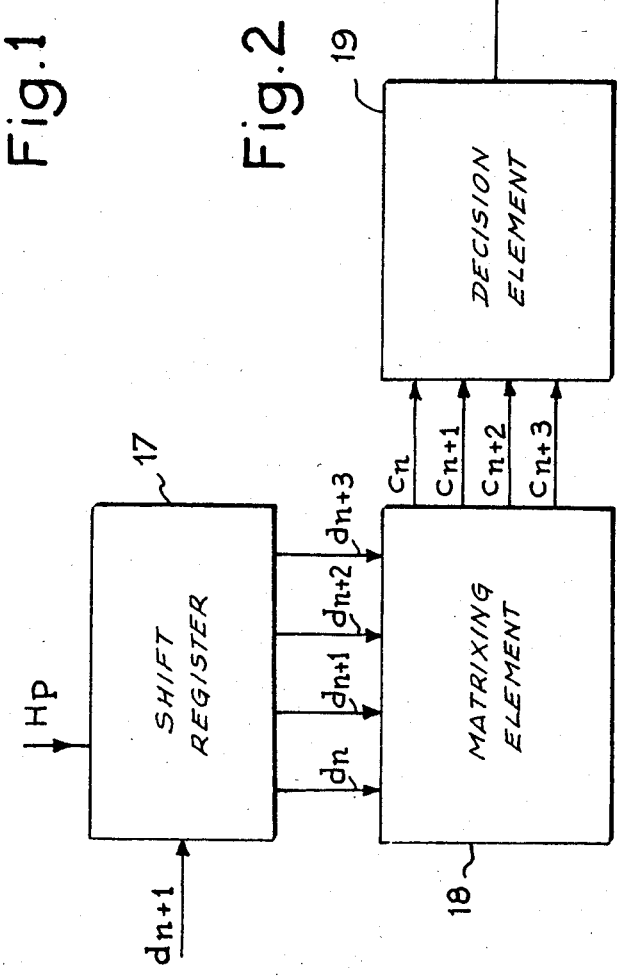

METHOD AND DEVICE FOR DETECTION OF MOVING POINTS IN A TELEVISION IMAGE FOR DIGITAL TELEVISION SYSTEMS PROVIDING CONDITIONAL-REPLENISHMENT BIT-RATE COMPRESSION

BACKGROUND OF THE INVENTION

1. Field of the Invention

The invention relates to a method and a device for detection of moving points in an image for digital television systems providing conditional-replenishment bit-rate compression in which the images received are updated or replenished only in respect of the significant points of the image which are in motion.

2. Description of the Prior Art

Methods of detection of moving points in an image for compressing the bit rate of coded television images between transmitters and receivers are already known and mostly consist in selecting data relating to the image points which have changed to an appreciable extent from one image to the next for the purpose of transmitting said data over the transmission channel which connects the transmitter to the different television receivers.

The movement-detecting devices or so-called motion detectors which are employed in the practical application of the methods mentioned above are also well-known and, in the case of each television image, carry out segmentation between the stationary and moving areas of the image.

In principle, a comparison of the difference in inter-image luminance of two similar points having a single threshold is sufficient to separate the two types of areas. In practice, however, the separation proves to be imperfect, in the first place by reason of the analog or digital noise which is always present in an image sequence and gives rise to confusion in the static or moving state of the image points and in the second place by reason of the bit-rate requirements imposed on the transmission channel.

The difficulty arises from the fact that, by modifying the adjustment of the single detection threshold of existing motion detectors, it is impossible to obtain a good rendition of the moving areas and a low bit rate in the transmission channel. In fact, by increasing the detection threshold in order to avoid detection of background noise, poorly reproduced moving areas are obtained at the level of the receivers whereas, by reducing the detection threshold in order to produce correct restitution of the movements of the image, an increasing quantity of background noise is allowed to pass, thereby increasing the transmitted data bit rate.

SUMMARY OF THE INVENTION

The object of the invention is to overcome the disadvantages mentioned in the foregoing.

To this end, the invention relates to a method for detection of moving points in a television image for digital television systems providing conditional-replenishment bit-rate compression. The method comprises splitting-up the image into blocks of $N \times M$ points, the points of one block being located at the intersections of N lines and M columns of the image, converting the $N \times M$ inter-image differences between corresponding values of luminance and/or of chrominance to $N \times M$ coefficients by means of an orthogonal transformation, comparing the absolute values of the coefficients obtained with one or a number of predetermined reference thresholds in order that the points placed at the center of a block should be stated as moving when the absolute value of at least one coefficient obtained as a result of this transformation is higher than at least one predetermined reference threshold.

The invention further relates to a device for carrying out the aforesaid method.

The main advantage of the method and device in accordance with the invention is that they permit better rendition of moving areas while ensuring good noise filtering in the uniform areas. These aims are mainly achieved by virtue of the fact that the motion decision no longer depends solely on the inter-image difference at the point considered but also depends on the inter-image differences in the vicinity of this point. The decision algorithm is formulated by utilizing the fact that the coefficients of the transformation considered give an idea of the distribution of frequencies, thus providing better motion detection by virtue of the fact that noise is eliminated when the coefficients are lower than predetermined threshold values.

BRIEF DESCRIPTION OF THE DRAWINGS

Other features of the invention will be more apparent upon consideration of the following description and accompanying drawings, wherein:

FIG. 1 is a general block diagram of a system for transmitting a television image with conditional-replenishment bit-rate compression;

FIG. 2 is a schematic diagram of the motion detector in accordance with the invention;

DESCRIPTION OF THE PREFERRED EMBODIMENT

Figure 3:
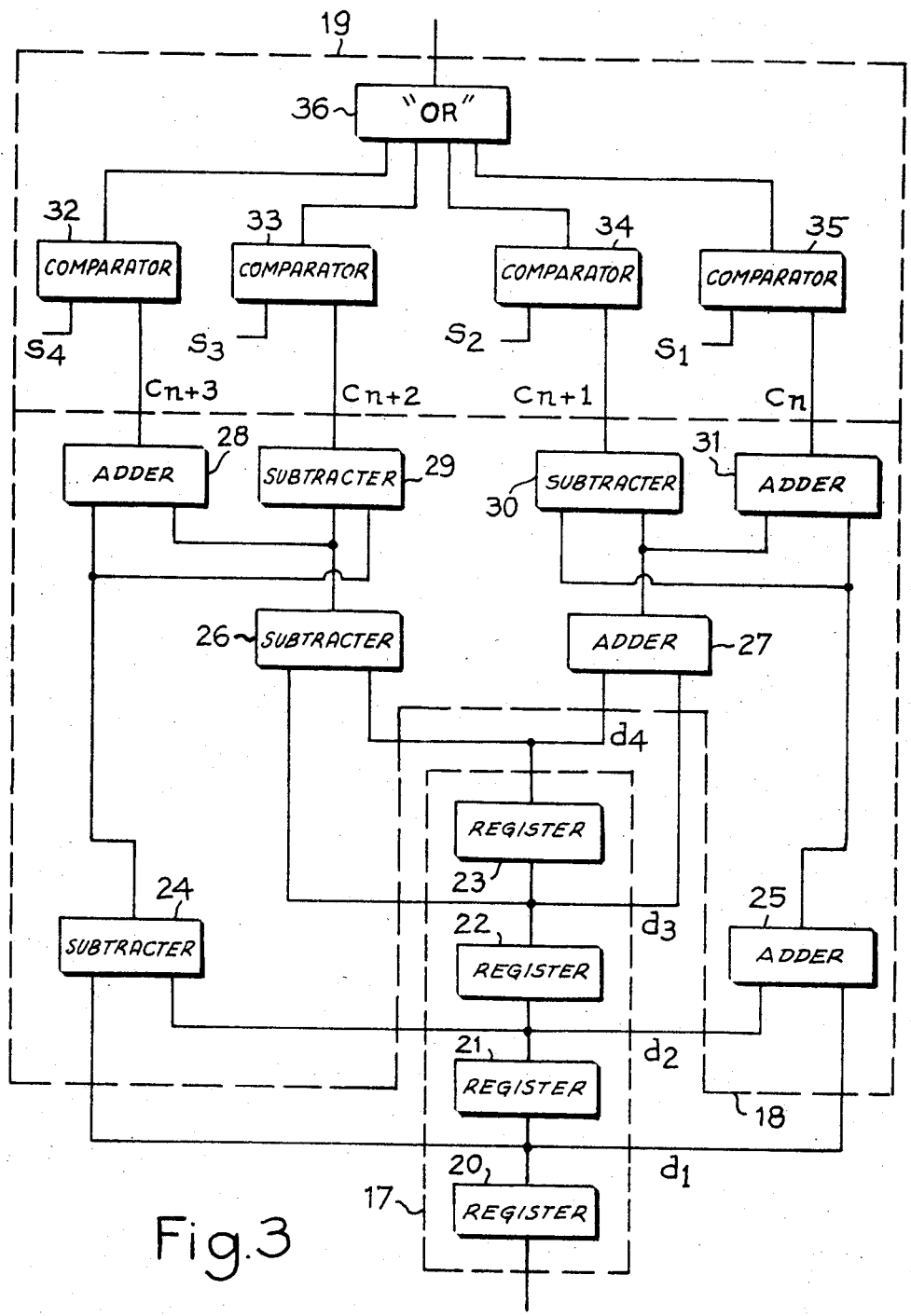
FIG. 3 is a block diagram in which one embodiment of the motion detector in accordance with the invention is shown in detail.

In order to avoid noise detection in contour or texture areas of the image, the method in accordance with the invention comprises, in a first step, splitting-up the image into blocks of $N \times M$ points, consecutive blocks being permitted to overlap to a partial extent if necessary and the points of a block being located at the intersections of N lines and M columns of the image. This first step further includes measuring the inter-image differences $d_n$ between the luminance and/or chrominance values of each point of an image block and applying to each inter-image difference block $N \times M$ thus produced an orthogonal transformation as described in the publication entitled "Consideration on the choice of orthogonal transformations and on their perspectives" by Henri Bucchi, Revue Acta Electronica, 19th April, 1976 - ps. 299–332. This makes it possible to obtain coefficients which intensity is a function of the spatial frequency variation in luminance and/or chrominance characteristics of the points located in the vicinity of the analyzed moving points. Since events arising from noise usually have higher frequencies than the frequencies of variation of the moving points, the aforesaid orthogonal transformation permits selection between the points resulting from background noise and those resulting from real displacements in the image. Thus at each point $P_n$, $P_{n+1}$, $P_{n+2}$, $P_{n+3}$ which are placed for example on the same image line, the method in accordance with the invention detects in a first step the inter-image differences $d_n$, $d_{n+1}$, $d_{n+2}$, $d_{n+3}$ and calculates as a function of the values of the inter-image differences thus obtained coefficients $C_n$, $C_{n+1}$, $C_{n+2}$ and $C_{n+3}$ resulting from a one-dimensional Hadamard transform of size 1×4

$$C_n = d_n + d_{n+1} + d_{n+2} + d_{n+3} \quad (1)$$

$$C_{n+1} = d_n + d_{n+1} - d_{n+2} - d_{n+3} \quad (2)$$

$$C_{n+2} = d_n - d_{n+1} - d_{n+2} + d_{n+3} \quad (3)$$

$$C_{n+3} = -d_n + d_{n+1} - d_{n+2} + d_{n+3} \quad (4)$$

Motion in the case of the points $P_{n+1}$ and $P_{n+2}$ is then detected when the absolute value of any one of the coefficients $C_n$ to $C_{n+3}$ is higher than a predetermined reference comparison threshold designated respectively by the notations $S_1$ to $S_4$. In order to take into account the fact that the noise usually has a higher spatial frequency than the spatial frequency of a moving image point, the values of the thresholds $S_1$ to $S_4$ are preferably adjusted in the increasing order of magnitude of the indices n to n+3. For example, by establishing the threshold $S_1$ at the value 12, it will be possible to set the thresholds $S_2$ to $S_4$ at the values $S_2=20$, $S_3=28$ and $S_4=255$.

A television image transmission system providing conditional-refreshment bit-rate compression for the practical application of the method in accordance with the invention is illustrated in FIG. 1. The system comprises in known manner a transmission unit 1 and a receiving unit 2, said units being linked to each other by means of a transmission channel 3. The transmission unit 1 comprises an input 4 to which are applied the video signal samples delivered by a television camera (which is external to the system and is not shown in the drawings), an image memory 5, a subtracter 6 for subtracting the samples applied to the input 4 from the samples delivered by the memory 5, a motion detector 7 whose input is coupled to the output of the subtracter 6, and a coder 8. The inputs 9 and 10 of said coder 8 are coupled respectively on the one hand to the output of the motion detector 7 and on the other hand to the input 4 of the transmission unit 1, the output of said coder being coupled to the transmission channel 3. The transmission unit 1 further comprises a decoder 12, the input of which is coupled to the output of the coder 8 and the output of which is coupled to the image memory 5. The input 13 of the receiving unit 2 is coupled to the transmission channel 3. Said receiving unit comprises a decoder 14 and an image memory 15 which are connected in series between the input point 13 and a visual display device 16.

By means of the subtracter 6, the system shown in FIG. 1 makes it possible to evaluate the inter-image difference $d_n$ in the luminance and/or chrominance information which accompanies each image point $P_n$ to be coded and to apply this difference to the input of the motion detector 7. The detector decides which image points are to be declared as having changed from one image to the next. Under the control of the motion detector, the coder 8 computes in respect of the points which have changed a coded luminance and address datum which it transmits over the transmission channel 3 in known manner by means of a transmission device (not shown in the drawings). At the receiver, the given luminance and address bits are decoded by the decoder 14, then transmitted to the interior of the image memory 15 in order to refresh the image which has previously been stored in this memory. By means of the decoder 12 of the transmission unit, the information available at the transmitter is the same as the information decoded at the receiver by the decoder 14 while the preceding image which has also been stored in the image memory 5 of the transmission unit can be refreshed. The result thereby achieved is that, if no error occurs, the same image coded in binary form is available at the same moment in the image memories 5 and 14.

The general arrangement of the motion detector 7 in accordance with the invention is shown in the schematic diagram of FIG. 2. The motion detector illustrated in FIG. 2 comprises an array of shift registers 17, a matrixing element 18, and a decision element 19. The shift-register array 17 receives on a first input the inter-image difference $d_n$ of the point $P_n$ of the image and is synchronized with a second input by the point clock of the device. The shift-register array 17 makes it possible to store in memory the inter-image differences $d_n$, $d_{n+1}$ to $d_{n+3}$ obtained at the output of the subtracter 6 of FIG. 1 in order to transmit said differences to the matrixing elexent 18. Said matrixing element 18 is constituted by an assembly of logic circuits made up of adders and subtracters which serve to compute the coefficients $C_n$ to $C_{n+3}$ on the basis of the data relating to inter-image differences $d_n$ to $d_{n+3}$ by utilizing the Hadamard transform described earlier. The coefficients $C_n$ to $C_{n+3}$ obtained at the output of the matrixing element are applied respectively to the input of the decision element 19 and this latter delivers at its output a signal S which indicates the moving or static state of the central points $P_{n+1}$, $P_{n+2}$.

A detailed example of construction of a motion detector in accordance with the invention will now be described with reference to FIG. 3 in which the constructional details of the shift-register array 17, of the filtering element 18 and of the decision element 19 are shown within dashed lines. The shift-register array 17 is constituted by four registers 20, 21, 22, 23 connected in series. Each register has a capacity of nine bits in order to be capable of storing the inter-image differences between successive points of one and the same image line which are applied to the input of the motion detector. In the case of a set of points $P_n$ to $P_{n+3}$ forming an image block of size 1×4 and analyzed respectively on one and the same image line, the contents of the array of registers 17 are respectively as follows. The register 23 contains the inter-image difference $d_n$, the register 22 contains the inter-image difference $d_{n+1}$, the register 21 contains the inter-image difference $d_{n+2}$, the register 20 contains the inter-image difference $d_{n+3}$. The matrixing element 18 is constituted by a group of operators designated respectively by the references 24 to 31 and connected together in order to calculate the coefficients $C_n$ to $C_{n+3}$ in accordance with the method described earlier. The operator 24 is a subtracter which is connected via its inputs respectively to the outputs of the registers 20 and 21 and which consequently establishes the difference between the inter-image differences $d_{n+3}$ and $d_{n+2}$. The operator 25 is an adder which is connected via its inputs to the outputs of the registers 20 and 21 in order to perform addition of the inter-image differences $d_{n+2}$ and $d_{n+3}$ which are stored within the registers 20 and 21. The operator 26 is a subtracter which is connected via its inputs to the outputs of the registers 22 and 23 and establishes the difference between the inter-image differences $d_n$ and $d_{n+1}$. Finally, the operator 27 is an adder which is connected via its inputs to the outputs of the registers 22 and 23 and performs addition of the interimage differences $d_n$ and $d_{n+1}$. The outputs of the adders 25 and 27 are connected respectively to the inputs of the operator 28 formed by an adder which adds the binary words transmitted by the adders 25 and 27. The adder 28 delivers at its output the coefficient $C_n$ which represents the sum of the inter-image differences $d_n$ to $d_{n+3}$ in accordance with relation (1) described earlier. The outputs of the adders 25 and 27 are also connected to the respective inputs of the operator 29 supplied by a subtracter which subtracts the binary words transmitted by the adders 25 and 27 in order to deliver at its output the binary word corresponding to the coefficient $C_{n+1}$ in accordance with the relation $$C_{n+1} = (d_n + d_{n+1}) - (d_{n+2} + d_{n+3})$$

which is equivalent to relation (2) described earlier.

The operators 30 and 31 are formed respectively by an adder and by a subtracter. The operator 30 has a first input connected to the output of the operator 24 and a second input connected to the output of the operator 26. The operator 31 has a first input connected to the output of the operator 24 and a second input connected to the output of the operator 26. The output of the operator 29 delivers the coefficient $C_{n+2}$ which is calculated in accordance with the relation $$C_{n+2} = (d_{n+3} - d_{n+2}) - (d_{n+1} - d_n)$$

which is equivalent to relation (3) described earlier.

The output of the operator 28 supplies the coefficient $C_{n+3}$ in accordance with the relation The output of the operator 28 supplies the coefficient $C_{n+3}$ in accordance with the relation $$C_{n+3} = (d_{n+3} - d_{n+2}) + (d_{n+1} - d_n)$$

which is equivalent to relation (4) described earlier.

The decision element 19 is constituted by the series of comparators 32 to 35, the outputs of which are connected respectively to the inputs of an OR-circuit 36. The series of comparators 32 to 35 compares the absolute value of the coefficients $C_n$ to $C_{n+3}$ obtained at the output of the operators 28 to 31 with respective thresholds designated by the notations $S_1$ to $S_4$. The threshold values $S_1$ to $S_4$ are applied respectively to a first input of the comparators 35 to 32, the second inputs of which are connected respectively to the corresponding output of an operator 28 to 31. The moving-point decision is supplied by the output of the OR-circuit 36 which delivers a signal having a logic level 1 when at least one coefficient $C_n$ to $C_{n+3}$ delivered at the output of the operators 28 to 31 is higher than the value of the threshold $S_1$ or $S_4$ which corresponds thereto.

Although the principle of the present invention has been described in the foregoing with reference to a particular example of construction, it should be understood that the description has been given solely by way of example and does not imply any limitation in the scope of the invention.

Alternative forms of construction can in fact be contemplated. In particular, the method in accordance with the invention can be extended to two-dimensional blocks of inter-image differences which, instead of being formed by $1 \times 4$ matrices, could be formed for example by square matrices of $2^q \times 2^q$ with $q \geq 1$, with the result that the movement is detected in respect of the four central points of the matrix.

It will also be apparent that other decision laws can be contemplated on the basis of the coefficients calculated by means of the method in accordance with the invention. In order to carry out a decision, it will be equally feasible to produce a linear combination of absolute values of the coefficients obtained by the orthogonal transformation and to compare the result of this combination with a single predetermined reference threshold in order to declare in motion the points placed at the center of the block in which calculation of the coefficients has taken place when the result of the combination is higher than the predetermined reference threshold.

What is claimed is:

1. In digital television systems having conditional replenishment bit-rate compression, a method for detecting moving points in a television image, the method comprising:
    splitting the image into blocks of N×M points, the points of an N×M image block being located at intersections of N lines and M columns of the image;
    measuring the inter-image differences between the luminance and chrominance values for each point of each of the N×M image blocks for obtaining N×M inter-image differences for each N×M block;
    applying to each inter-image difference N×M block an orthogonal transformation for converting the N×M inter-image differences to N×M coefficients;
    comparing the absolute values of the coefficients of a block of N×M points with at least one predetermined reference threshold for ascertaining the movement of points located at the center of the block of N×M points;
    whereby the center points are ascertained as moving when the absolute value of at least one of the coefficients is higher than the at least one predetermined reference threshold.

2. The method according to claim 1, wherein the splitting step further comprises:
    spltting the image into one-dimensional blocks, each of the one-dimensional blocks including points located on the same line or on the same column.

3. The method according to claim 1, wherein the splitting step further comprises:
    splitting the image into one-dimensional blocks, each of the one-dimensional blocks including a square matrix of points located at the intersections of N lines and M columns, where M is a power of 2 such that $M = 2^q$ where q is a positive whole number greater than one.

4. The method according to claim 1, wherein the comparing step further comprises:
    comparing the absolute values of the coefficients of a block of N×M points with a plurality of predetermined reference thresholds, the value of the plurality of thresholds increase in an increasing order of spatial frequencies corresponding to the respective magnitude of the coefficients.

5. The method according to claim 1, further comprising:
    forming a linear combination of the absolute values of the coefficients; and comparing the result of the linear combination with a single predetermined reference threshold;

wherein the points placed at the center of a block are declared to be in motion when the result of the linear combination is higher than the predetermined reference threshold.

6. In digital television systems having conditional replenishment bit-rate compression, a television image divided into blocks of $N \times M$ points, an apparatus for detecting moving points in the television image, the apparatus comprising:

an array of shift registers for storing the inter-image differences between luminance and chrominance values for the points of each $N \times M$ block;

a matrixing element coupled to the array of shift registers for receiving the inter-image differences, the matrixing element further effecting a Hadamard transformation on the inter-image differences for converting the same differences into corresponding inter-image coefficients; and a decision element coupled to the matrix element for receiving the inter-image coefficients, the decision element further comparing the inter-image coefficients with at least one predetermined threshold for ascertaining whether or not the points located at the center of each $N \times M$ block are moving.

* * * * *